Dec. 31, 1968    A. P. WEBER    3,419,236
PERSONNEL LOWERING DEVICE
Filed Nov. 9, 1967    Sheet 1 of 3

INVENTOR.
ALPHONS P. WEBER
BY Harry A. Herbert Jr.
ATTORNEY
Arthur R. Parker
AGENT

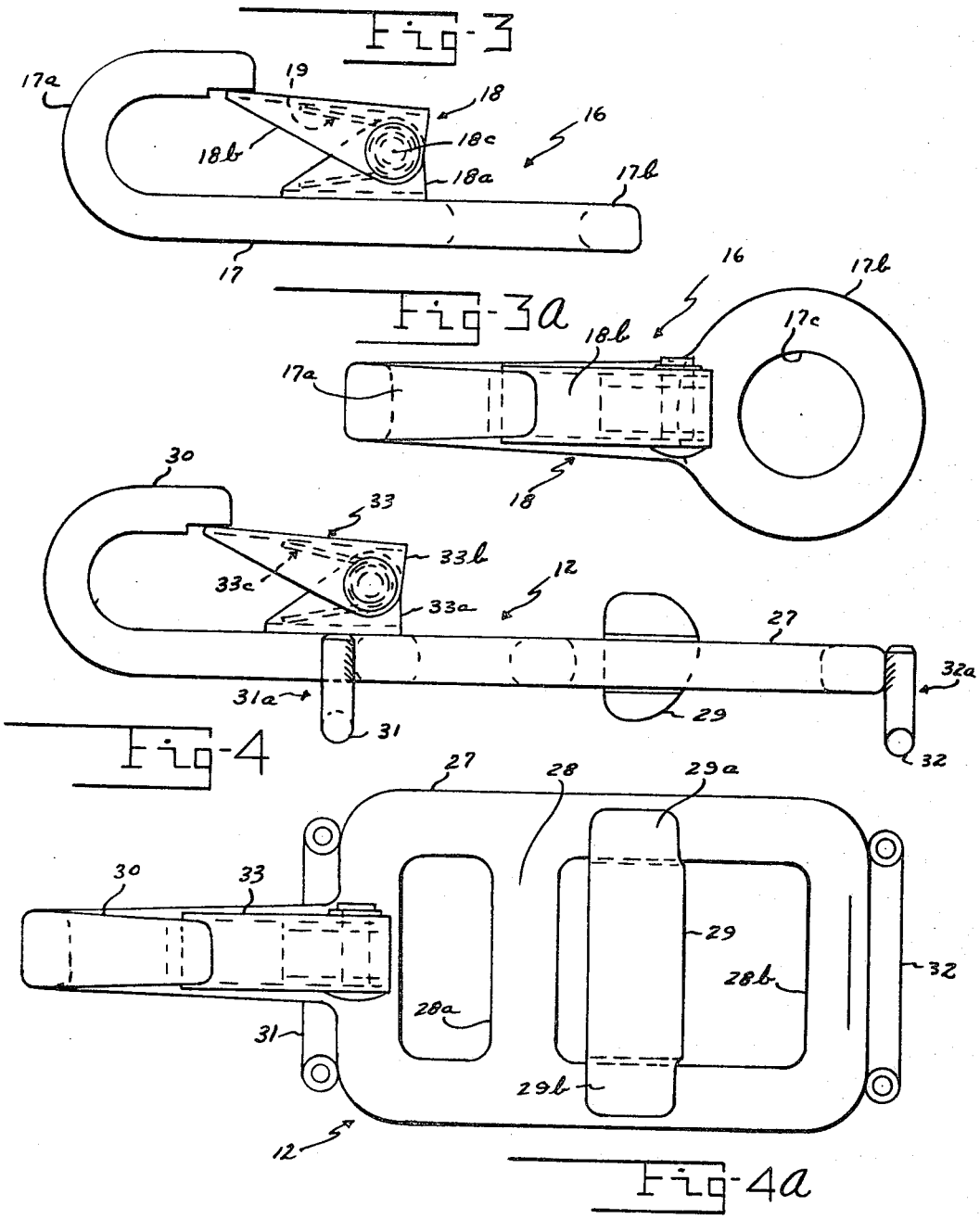

# United States Patent Office 3,419,236
Patented Dec. 31, 1968

3,419,236
PERSONNEL LOWERING DEVICE
Alphons P. Weber, 1325 Mayapple Ave.,
Dayton, Ohio 45432
Filed Nov. 9, 1967, Ser. No. 681,646
3 Claims. (Cl. 244—151)

ABSTRACT OF THE DISCLOSURE

An emergency lowering line for rescuing parachuting aircrewmen and other parachutists marooned in tall trees or other high places is slidably positioned in a lowering and braking device that includes an open frame with a snap hook on one end attached to the parachute harness, a pair of bail members on its opposite ends, a fixed transverse bar member, and a slidably mounted transverse bar member adjustable on the frame relative to the fixed bar member. The lowering line is stowed in the parachute pack with a free end of the line being guided by the pair of bail members and reeved through the transverse bar members, and then attached to the parachute risers. The slidable bar member is automatically movable against the lowering line to brake and control its slidable movement through the lowering device frame and the lowering line itself may be manually manipulated to further control the rate of descent of the marooned parachutist.

BACKGROUND OF THE INVENTION

This invention relates generally to the field of parachuting and, in particular, to emergency rescue devices used in connection with the parachute to extricate marooned parachuting aircrewmen and other parachutists from high places, such as tall trees.

As a result of experience gained partially under combat conditions in Southeast Asia, it became evident that there was a need for some means of rescuing ejecting aircrewmen from a marooned position in high trees. An in-house governmental development program was initiated, and several commercially available and foreign used designs, pertinent to the present requirement, were evaluated. However, these designs proved undesirable, since they were too bulky and were not integrated with the parachute, and therefore, failed to comply with the requirement for a reliable item to be carried on the aircrewman's person with a minimum of increased weight. For example, one commercial item, known as the Sky Genie, used a round rope reeved through a spool. This item also utilized a spindle that produced excessive heat, under test conditions, and proved to be only marginally safe. Another item, the Koch, used a webbing extending through a cylindrical friction device that was 6" in diameter by 2" in thickness. Other items evaluated, but found unacceptable, included rope devices equipped with trigger grips that required an undesirable manual dexterity to operate. Moreover, none of these devices integrated with the parachute or other personnel equipment. Accordingly, the present invention was developed to overcome the above noted disadvantages inherent in previously developed emergency rescue devices in a unique manner, as will become readily apparent from the following disclosure thereof.

SUMMARY OF THE INVENTION

A principal object of the present invention, therefore, is to provide a new and improved emergency lowering device used in conjunction with an improved assembly lowering line for rescuing marooned parachuting aircrewman and other parachutists from high places, and which is simple in design, easy to manipulate, and offers increased safety and greater reliability in operation.

Another object of the invention resides in the use of an improved emergency lowering device for saving marooned parachutists from high trees and other relatively inaccessible places, which device is of minimum bulk and weight and is easily integrated as a permanent part of the standard parachute pack, and, in addition performs its intended function, without unduly encumbering the wearer or interfering with the performance of normal duties.

Other objects and advantages of the invention will become self evident from the following summary and detailed description, taken in connection with the accompanying drawings.

BRIEF DESCRIPTION OF THE DRAWINGS

FIGURES 3 and 3a represent side and top views, respectively, of the snap hook mechanism attached to the free end of the emergency lowering line of the present assembly and used to interconnect the emergency lowering and braking device of the present invention to the parachute risers; and FIGURES 4 and 4a, respectively, represent side and top views, illustrating additional details of the improved emergency lowering and braking device of the present invention.

DESCRIPTION OF THE PREFERRED EMBODIMENT

Figure 1:
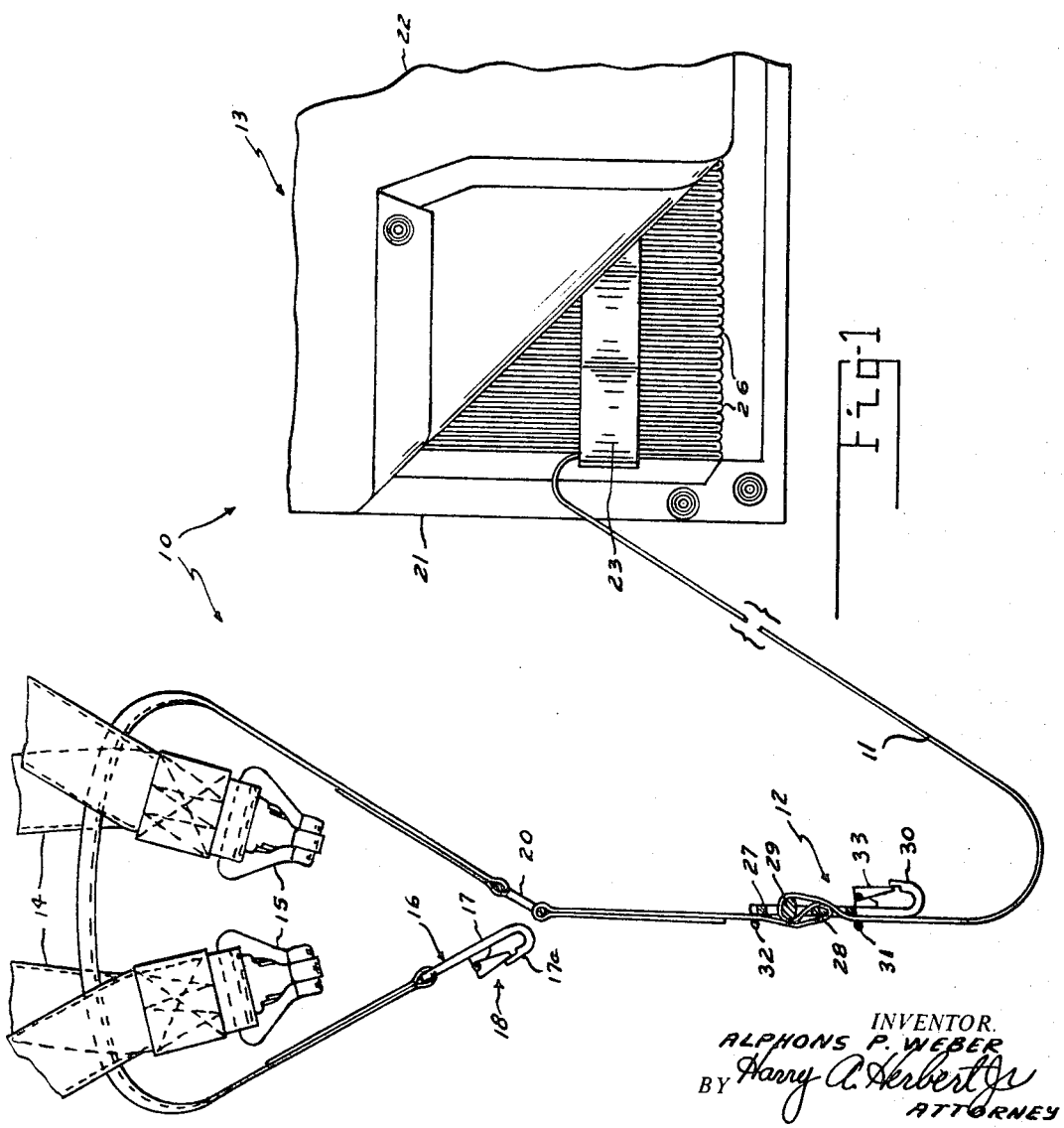
FIGURE 1 is a partly broken away overall assembly view of the present invention, illustrating the emergency lowering and braking device thereof with its lowering rescue line shown stowed in a stowage pack and with its free end attached to a set of parachute risers.

Referring to the drawing and, in particular, to FIGURE 1 thereof, the present invention is shown incorporated in an overall personnel lowering device assembly indicated generally at 10 as including the lowering rescue line 11, the improved emergency lowering and braking device 12 forming the key feature of the present invention, and the stowage pack 13. The pack 13 is designed to replace in all instances the comfort back pad of the parachute pack or, in the case of the F4C aircraft, the lumbar pad, and in this manner, the present invention is integrated with or in other words becomes an integral part of the personnel parachute. Lowering line 11 is, in operation, passed through a set of parachute risers, such as those shown in broken away form at 14 in FIGURE 1. The male fittings for the parachute canopy release mechanism is indicated at 15. The line 11 is equipped, at its free end, with a snap hook device 16 that will be described hereinafter in detail with respect to FIGURES 3 and 3a of the drawings.

As seen in FIGURES 3 and 3a, the aforesaid snap hook device 16 includes a main frame member 17 which is constructed of steel and incorporates an integrally formed hook portion 17a on one end thereof, and an enlarged circular ring portion 17b on the opposite end thereof. Hook portion 17a is attached to a ring element 20 formed in the free end portion of lowering line 11 above the lowering device 12 and is retained in its attached position thereto by means of a metal spring-operated catch member 18 that consists of a main upstanding support element 18a that may be directly riveted to the frame member 17, and a latch member 18b that is pivotally supported on upstanding element 18a for movement relative thereto about a pivot axis at 18c between a depressed or lower, unlatched position and an upper, latched position"

in engagement with the hook portion 17a of the snap hook device 16, as shown. Latch member 18b is normally urged to its upper, latched position by means of the latching spring at 19. Integrally formed on the other end of the aforesaid frame member 17 is the previously referred to enlarged circular ring portion 17b. Said ring portion 17b incorporates a centrally disposed circular opening 17c (note FIGURE 3a), which opening provides the means of attaching the snap hook device 16 to the free end of the lowering line 11. In this regard, the line 11 is passed through the aforesaid opening 17c and then stitched back upon itself (note FIGURE 1).

Figure 2:
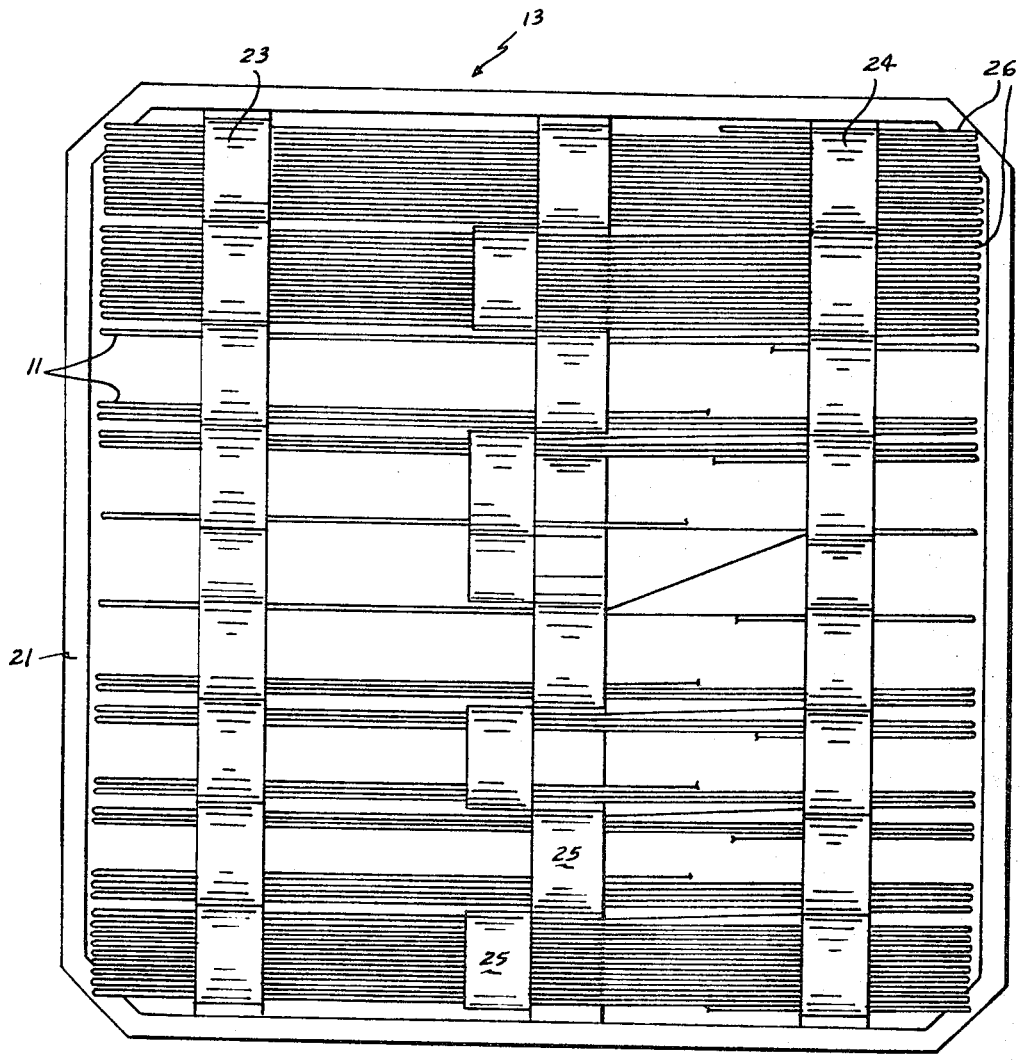
FIGURE 2 is a top view of the stowage pack portion of the overall assembly of FIGURE 1, illustrating additional details of the improved means of stowing the emergency lowering line of the present invention as an integral part of the standard parachute pack.

When not in use, the major portion of the lowering line 11 is stowed in the form of a plurality of neatly arranged hanks, as at 26 in FIGURE 2, in the previously noted stowage pack 13. In preparation, a flat tubular 2300 lb. tensile strength, ¾ inch nylon webbing of more than 150 feet in length is selected for the lowering line 11. The additional strength in the line allows for the build-up of heat in the device during rapid descent and subsequent fast stops. The aforesaid stowage pack 13 includes a pack pad 21, a top cover 22 (note FIGURE 1) that is snapped in place on back pad 21, a double row of elastic stow loops, indicated respectively and generally at 23 and 24, each containing a total of eight elastic cotton webbing loops that are stitched to the back pad 21, and a series of eight alternately arranged nylon stow tapes indicated generally at 25. As indicated in the drawing, these stow tapes 25 are disposed in staggered relation on the center portion of back pad 21. They are also stitched to the aforesaid back pad at one end thereof only to thereby leave their opposite ends free to be snugly wrapped around a respective hank 26 formed in the lowering line 11 during its assembly in stowed condition within the pack 13.

Initially, the lowering line 11 is formed into the previously mentioned plurality of hanks 26, by any suitable means, such as by drilling a double row of ⅛ inch holes, ½ inch apart, in a ¾ inch plywood board and then installing pegs in the drilled holes. The two rows of holes thus formed may be either 8, 11 or 12 inches apart, depending on whether the seat style parachute pack, the F4C pack, or the rectangular or square pack is to be used. Each hank 26 may then be formed by looping the line 11 in separate bights around respective pairs of pegs until the preselected number of nine loops is obtained. Then, while still mounted on the plywood board, the nine loops or bights are stitched together preferably with one turn "E" thread at a distance of ½ inch from each end of the loops. These stitches are then pulled tight, and the hank thus formed is removed from the board. This process is continued until the stowed portion of the lowering line 11 is completely formed into a series of 8 hanks. Each hank 26 is then installed in the stowage pack 13 with their respective opposite ends inserted, and resiliently and releasably retained in position in a corresponding pair of elastic stow loops 23, 24. As each individual hank 26 is inserted in the pair of stop loops 23, 24 provided therefor, the stow tape 25 corresponding thereto is positioned in place around the central portion of the aforesaid hank to thereby provide additional support for the lowering line 11 when the latter is not in use. The "E" ties are then cut and the thread removed, after which the top cover 22 is snapped in place on the back pad 21. The emergency lowering and braking device 12 may then be installed on the lowering line 11 and operated to lower a marooned parachutist in the manner and by specific means to be hereinafter described in detail.

As seen particularly in FIGURES 4 and 4a, the improved emergency lowering and braking device of the present invention is indicated generally at 12 as including in part a substantially open frame 27, a snap hook device formed on one end as at 30, an integral cross-piece element or fixed transverse bar 28, and a sliding adjuster transverse bar 29. The fixed bar 28 is formed in the frame 27 at a position that is considerably nearer to the snap hook device 30 or the left side of the frame as viewed in FIGURE 4a, for example. In this manner, the frame 27 is formed with a relatively small sized opening at 28a and a relatively large sized opening at 28b divided by the fixed bar 28. The sliding adjuster bar 29 is mounted within the relatively large opening 28b for slidable movement on the opposite sides of the frame 27, as by means of the slotted end portions 29a and 29b (see FIGURE 4a) formed on the opposite ends thereof. The bar 29 also incorporates a serrated surface on its side facing fixed bar 28 and thus ensures a positive acting grip against the lowering line 11 to control the latter's relative movement through the lowering device 12, as will be hereinafter discussed in more detail.

In addition, the frame 27 incorporates a pair of bail members disposed on opposite sides thereof, as indicated at 31 and 32, respectively. These bail members 31, 32, which may be made in a substantially flat U-shaped, half hoop, or other similar configuration incorporated relatively narrow and elongated openings indicated generally at 31a and 32a in FIGURE 4, which openings provide a guide means for the lowering line 11 both during its initial assembly to the lowering device 12 and in its subsequent slidable movement relative thereto during its use in an emergency. The snap hook device 30 formed on one end of the frame 27 is identical to the hook portion 17a of the previously described snap hook device 16 formed on the free end of the lowering line 11. Thus, the snap hook device 30 engages with a similar catch member, as indicated generally at 33, that includes the main upstanding support element 33a that is mounted directly on the frame 27, and the spring urged latch member 33b that operates in identical manner to its counterpart in the catch member 18 of the snap hook device 16 and is therefore urged from a depressed, unlatched position to an upper, latched position by a similar spring at 33c to thereby engage with the snap hook device 30.

In assembling the present invention, the emergency lowering and braking device 12 is installed at a distance of 29 inches from the free end of the lowering line 11. In this connection, the free end of the line is initially fed through the lowermost bail member 31, from whence it is reeved upwardly through the relatively small frame opening 28a, and then downwardly through the relatively large frame opening 28b, and finally led around and underneath the adjuster bar 29 and back upwardly through the same opening 28b between the adjuster and fixed bars 28 and 29. At this point, the line 11 is in contact with and lies directly alongside a portion of the line that was initially reeved through the relatively small frame opening 28a. The line 11 is then passed back under the fixed bar 28 and the slidable bar 29, in that order, and finally out through the uppermost bail member 32. In its final passage from a point around and under the fixed and slidable bar members 28, 29, line 11 also contacts the portion of the line that was initially reeved around and under the slidable bar member 29. With the foregoing reeving arrangement, when a load such as a parachutist is placed on the line 11, the lowering device 11 generally and the slidable bar member 29 in particular act as a built-in and inherent braking mechanism tending to restrict relative movement between the line 11 and the lowering device 12. In this regard, the serrated surface incorporated on the slidable bar member 29 is automatically squeezed against the line 11 and the fixed bar member 28 with an inherent braking force of approximately 60 pounds.

To complete the assembly of the present device, after the lowering line 11 has been reeved through the emergency lowering and braking device 12 in the manner described above, a 2000 pound test ring, as at 20, is installed, as by sewing, in the line 11 above the device 12. This leaves 27 inches to the free end of the line. The previously described snap hook device 16 is then installed on the free end of the lowering line 11, and the assembly of the present invention is then ready for use in an emergency.

The operation of the present invention will now be described with particular reference to FIGURE 1. When not in use, the lowering line 11 is stowed in the stowage pack 13, as hereinbefore indicated. The free end of the line 11, together with its snap hook device 16 and the emergency lowering and braking device 12 are stored in a pocket (not shown) that may be formed on a convenient front strap portion of the parachute harness for ready availability to the parachutist. At this time, approximaely 30 inches of the free end of line 11 would have been previously routed to the parachute riser location. When an emergency situation presents itself, the marooned parachutist whose parachute has become entangled in a tall tree, for example, extracts the snap hook device 16 and the emergency lowering and braking device 12 from the front pocket that may be provided therefor and then connects the emergency device 12, by means of its snap hook device 30, to the parachute harness chest strap "V" ring (not shown) located on the standard parachute harness. The free end of the line 11 is next routed through the parachute risers 14 above the canopy releases, the male fittings therefor being indicated at 15, and the snap hook device 16 on the end thereof is used to hook or connect the free end to the ring element 20 installed in the line 11 above the device 12, as previously explained. An alternate method of installation of the line 11 is to secure the free end around a nearby limb or branch, if available, that is sufficiently strong enough to hold the weight of the marooned parachutist's body under a 3g load.

After completion of the above operation, the marooned parachutist is then ready to release the parachute canopy by actuating one release at a time and then become suspended from his chest strap by virtue of the connection between the device 12 and the "V" ring. His rate of descent from the marooned position is then controlled by pulling out the line 11 from the pack 13 and gradually feeding the line into the emergency lowering and braking device 12. With the unique design of the present assembly, the rate of descent can be easily controlled by the parachutist holding the line 11 between the bottom portion of the emergency device 12 and stowage pack 13 at a convenient position and, by varying the angular relation between the line and the lowermost bail member 31 on the device 12, for example, the rate of descent may be easily controlled to a safe value. In fact, only a slight holding pressure on the line 11 is required to completely stop the descent if desired. Moreover, the end of the lowering line 11 opposite the previously referenced free end is folded twice back upon itself and sewn to prevent its disengagement from emergency device 12 when the lower end of the line 11 is reached. In actual operation, the last twenty-five feet of the line may be dyed a suitable color, such as yellow, to indicate the approaching end thereof.

I claim:

1. An emergency lowering device assembly for rescuing a marooned parachutist whose parachute has become entangled in tall trees or other high places, comprising a lowering rescue line of an extended length normally sufficient to reach the ground when in its fully deployed condition said lowering rescue line having a free upper end portion adapted to be routed through the risers of the entangled parachute prior to the parachute canopy being released through the operation of a set of canopy release mechanisms adapted to be mounted on the shoulder straps of the parachute harness, the said routing of the lowering rescue line through the parachute risers both facilitating the suspension of said line therefrom during the rescue operation and providing for the quick release of said line therefrom immediately subsequent to the marooned parachutist reaching the ground or some intermediate level, said lowering rescue line further incorporating a first, fixed attachment means at a position thereon within easy reach of the marooned parachutist; and a second, releasable attachment means mounted on the free upper end of said line and oriented in a reversed relation to and extending across and in front of the body of the marooned parachutist for releasable engagement with said line at the position of said first, fixed attachment means and thereby being readily available for quick manipulation by the marooned parachutist, said emergency lowering device assembly further comprising; a storage pack forming an integral part of the parachute harness portion of the standard parachute pack and being further equipped with means normally retaining the lowering line in freely-releasable and stowed condition therein for simultaneous quick deploymemnt therefrom and manual control thereof by the marooned parachutist in the event of an emergency; and an emergency lowering device adapted to be attached to the parachute harness with said harness being separable from the parachute canopy by operation of the canopy release mechanisms and thereby to be worn by the marooned parachutist together with said stowage pack and the lowering device attached thereto throughout the emergency rescue, said lowering device being slidably mounted on, and with the free upper end portion of said rescue line being reeved therethrough for providing slidable movement therebetween, said lowering device being positioned on said rescue line below said first fixed lowering line-attachment means and having braking means adapted to grip the lowering line with an initial built-in gripping force of a relatively large and predetermined value inherently sufficient to initially substantially reduce the rate of lowering movement of the marooned parachutist and thereby subsequently facilitate the relatively finer adjustment and quicker control of the descending movement of the marooned parachutist to rates of descent varying from zero to relative safe values.

2. An emergency lowering device assembly as in claim 1, wherein said lowering line is formed into a series of connected hank segments each representing a predetermined number of loops, and said stowage pack comprises the back or lumbar pad portion of the standard parachute pack, said stowage pack further containing a plurality of elastic stow loops arranged in oppositely-disposed pairs to accommodate opposite end portions of, and thereby providing resilient support therewithin for the series of hank segments formed in said lowering line.

3. An emergency lowering device assembly as in claim 1, wherein said emergency lowering device incorporates a main frame element divided into two unequal openings by a first, fixed transverse member adapted to receive the lowering line in reeved relation therearound after being fed upwardly through the smaller of the said two openings; and a second, movably-mounted transverse member slidably positioned within the larger of said two openings and having a frictional gripping surface disposed adjacent to said first, fixed transverse member and engageable with said rescue line, after the latter has been led in a reversed and contacting relation around the bottom surface of said second, movably-mounted member to a continued rescue line portion extending upwardly through, and in compressed relation between said first and second transverse members, said second, movably-mounted member being further adjustable by the manual movement of the line relative to the second, movably-mounted member by the descending parachutist selectively upwardly and outwardly and/or downwardly and inwardly, to thereby increase or decrease the gripping force applied to the line in direct proportion to the angle of manual adjustment of the rescue line relative thereto; said lowering device-main frame element further incorporating at least one bail element mounted in immediate adjacent relation to, and depending from the side thereof closest to said first, fixed transverse member and acting in concert therewith to thereby facilitate the correct orientation of the lowering line upwardly through said emergency lowering device and further providing a variable frictional grip of a finer adjustment and control in proportion to the angular relation formed between said bail element and said lowering line, said bail element further being oriented in a predetermined and depending relation both to said main frame element and said first, fixed transverse member to thereby ensure the collective engagement of the lowering line simultaneously with said bail element and said second, movably-mounted transverse member and thus effecting an increasingly larger-and-larger gripping force on said lowering line for a given degree of angular adjustment therebetween and resulting from the combined action of said bail element and said movably-mounted transverse member on said lowering line.

References Cited

UNITED STATES PATENTS

| | | | |
|---|---|---|---|
| 1,704,361 | 3/1929 | Johnsen | 182—191 |
| 2,323,883 | 7/1943 | Wiley | 182—191 |
| 2,475,631 | 7/1949 | Miller et al. | 244—151 |
| 2,933,157 | 4/1960 | Huber | 188—65.1 |

FOREIGN PATENTS

| | | |
|---|---|---|
| 701,557 | 1/1965 | Canada. |

MILTON BUCHLER, *Primary Examiner.*

RICHARD A. DORNON, *Assistant Examiner.*

U.S. Cl. X.R.

182—5; 188—65.1